United States Patent [19]

Boyle et al.

[11] Patent Number: 5,577,209

[45] Date of Patent: Nov. 19, 1996

[54] APPARATUS AND METHOD FOR PROVIDING MULTI-LEVEL SECURITY FOR COMMUNICATION AMONG COMPUTERS AND TERMINALS ON A NETWORK

[75] Inventors: John M. Boyle, Cranford, N.J.; Eric S. Maiwald, Southfields, N.Y.; David W. Snow, Convent Station, N.J.

[73] Assignee: ITT Corporation, New York, N.Y.

[21] Appl. No.: 270,398

[22] Filed: Jul. 5, 1994

Related U.S. Application Data

[63] Continuation of Ser. No. 728,633, Jul. 11, 1991, abandoned.

[51] Int. Cl.$^6$ .................................................... G06F 13/00
[52] U.S. Cl. ......................... 395/200.06; 340/825.31; 380/23; 395/309; 395/727; 364/DIG. 1
[58] Field of Search ................... 364/709.05; 380/23; 395/600, 325, 725, 800, 200.01, 200.06, 200.09, 200.12, 309, 200.11, 727; 340/825.31; 370/85.13

[56] References Cited

U.S. PATENT DOCUMENTS

| | | | |
|---|---|---|---|
| 4,694,492 | 9/1987 | Wirstrom et al. | 380/23 |
| 4,799,153 | 1/1989 | Hann et al. | 395/325 |
| 4,962,449 | 10/1990 | Schlesinger | 395/325 |
| 5,056,140 | 10/1991 | Kimbell | 380/23 |
| 5,113,499 | 5/1992 | Ankney et al. | 395/325 |
| 5,163,147 | 11/1992 | Orita | 395/600 |
| 5,283,828 | 2/1994 | Saunders et al. | 380/4 |

OTHER PUBLICATIONS

Lu et al, "A Model for Multilevel Security in Computer Networks", IEEE, Mar. 1988, pp. 1095–1104.
Network Communications (OSI Model); Jan Watts, PC–Computing, v4, No. 1, p. 164 (2); Jan. 1991.
Microsoft 05–2 to Conform to Posix, C2 Security Level; Scott Palmer, Fed. Comp. Week; v3, No. 15, p. 6(1); Apr. 10, 1989 (abstract).
Security Through Software (Unix System V/MLS Multi–Level Security O/S; Bob Mitze, Exe, v4, No. 6, p. 53 (1); Nov., 1989.

Primary Examiner—Thomas G. Black
Assistant Examiner—Hosain T. Alam
Attorney, Agent, or Firm—Plevy & Associates; Patrick M. Hogan

[57] ABSTRACT

A multi-level security apparatus and method for a network employs a secure network interface unit (SNIU) coupled between each host or user computer unit and a network, and a security management (SM) architecture, including a security manager (SM) coupled to the network, for controlling the operation and configuration of the SNIUs coupled to the network. Each SNIU is operative at a session level of interconnection which occurs when a user on the network is identified and a communication session is to commence. When an SNIU is implemented at each computer unit on the network, a global security perimeter is provided. In a preferred embodiment, the SNIU is configured to perform a defined session level protocol (SLP), including the core functions of user interface, session manager, dialog manager, association manager and data sealer, and network interface. The SM architecture is implemented to ensure user accountability, configuration management, security administration, and validation key management on the network. The SM functions are distributed over three platforms, i.e., a SNIU security manager (SSM), an area security manager (ASM), and a network security manager (NSM).

20 Claims, 14 Drawing Sheets

1. GENERATE KEY REQUEST
2. PUBLIC KEY SENT
3. NEW CERTIFICATE RETURNED

APPARATUS AND METHOD FOR PROVIDING MULTI-LEVEL SECURITY FOR COMMUNICATION AMONG COMPUTERS AND TERMINALS ON A NETWORK

This is a continuation of application Ser. No. 07/728,633, filed on Jul. 11, 1991, entitled APPARATUS AND METHOD FOR PROVIDING MULTI-LEVEL SECURITY FOR COMMUNICATION AMONG COMPUTERS AND TERMINALS ON A NETWORK, and now abandoned.

FIELD OF THE INVENTION

The present invention relates in general to secure and multi-level secure (MLS) networks and in particular to apparatus and method for providing security and multi-level security for a non-secure network.

BACKGROUND OF THE INVENTION

Multi-level secure (MLS) networks provide a means of transmitting data of different classification levels (i.e. Unclassified, Confidential, Secret and Top Secret) over the same physical network. To be secure, the network must provide the following security functions: data integrity protection, separation of data types, access control, authentication and user identification and accountability.

Data integrity protection ensures that data sent to a terminal is not modified enroute. Header information and security level are also protected against uninvited modification. Data integrity protection can be performed by checksum routines or through transformation of data, which includes private key encryption and public key encryption.

Separation of data types controls the ability of a user to send or receive certain types of data. Data types can include voice, video, EMail, etc. For instance, a host might not be able to handle video data, and, therefore, the separation function would prevent the host from receiving video data. The system should include sequential review prior to data release where a plurality of users would review the data to approve release prior to actual release and the use of data type to separate management type data from ordinary user traffic.

Access control restricts communication to and from a host. In rule based access control, access is determined by the system assigned security attributes. For instance, only a user having Secret or Top Secret security clearance might be allowed access to classified information. In identity based access control, access is determined by user-defined attributes. For instance, access may be denied if the user is not identified as an authorized participant on a particular project. For control of network assets, a user may be denied access to certain elements of the network. For instance, a user might be denied access to a modem, or to a data link, or to communication on a path from one address to another address.

Identification of a user can be accomplished by a unique name, password, retina scan, smart card or even a key for the host. Accountability ensures that the a specific user is accountable for particular actions. Once a user establishes a network connection, it may be desirable that the user's activities be audited such that a "trail" is created. If the user's actions do not conform to a set of norms, the connection may be terminated.

Currently, there are three general approaches to providing security for a network: trusted networks, trusted hosts with trusted protocols, and encryption devices. The trusted network provides security by placing security measures within the configuration of the network. In general, the trusted network requires that existing protocols and, in some cases, physical elements be replaced with secure systems. In the Boeing MLS Lan, for instance, the backbone cabling is replaced by optical fiber and all access to the backbone is mediated by security devices. In the Verdix VSLAN, similar security devices are used to interface to the network, and the network uses encryption instead of fiber optics to protect the security of information transmitted between devices. VSLAN is limited to users on a local area network (LAN) as is the Boeing MLS Lan.

Trusted hosts are host computers that provide security for a network by reviewing and controlling the transmission of all data on the network. For example, the U.S. National Security Agency (NSA) has initiated a program called Secure Data Network System (SDNS) which seeks to implement a secure protocol for trusted hosts. In order to implement this approach, the installed base of existing host computers must be upgraded to run the secure protocol. Such systems operate at the Network or Transport Layers (Layers 3 or 4) of the Open Systems Interconnection (OSI) model.

Encryption devices are used in a network environment to protect the confidentiality of information. They may also be used for separation of data types or classification levels. Packet encryptors or end-to-end encryption (EEE) devices, for instance, utilize different keys and labels in protocol headers to assure the protection of data. However, these protocols lack user accountability since they do not identify which user of the host is using the network, nor are they capable of preventing certain users from accessing the network. EEE devices typically operate at the Network Layer (Layer 3) of the OSI model. There is a government effort to develop cryptographic protocols which operate at other protocol layers.

It would be highly desirable to provide multi-level security in a non-secure environment, i.e. where both the network and the hosts are not trusted, so that existing hosts and network assets would not have to be replaced by trusted hosts or secure network assets. It is also required that such an MLS system must provide user accountability and data integrity during all phases of operation within the network.

SUMMARY OF THE INVENTION

In accordance with the present invention, a network security apparatus and method for a network comprises a secure network interface unit (SNIU) coupled between each host or user computer unit, which may be non-secure, and a network, which may be non-secure, and a security management (SM) architecture, including a security manager (SM) connected to each of the SNIUS for controlling their operation and configuration on the network. Each SNIU is operative at a session layer of interconnection which occurs when a user on the network is identified and a communication session is to commence. When an SNIU is implemented at each computer unit to be secured on the network, a global security perimeter is provided for ensuring security policy enforcement, controlled communication release, controlled communication flow, and secure session protocols through each computer unit interface. The SM architecture is implemented to ensure user accountability, configuration management, security administration, and cryptographic key management among the SNIUS.

In a preferred embodiment, the SNIU is configured to perform a defined trusted session layer protocol (TSP), including the core functions of user interface or service interface, session manager, dialog manager, association manager, data sealer, and network interface. The user/service interface functions allow a user to access the network through the SNIU, including translating data to the format used in the SNIU, passing data between the computer unit and the SNIU, and providing access to communication ports through the SNIU. Significant portions of the user/service interface do not require the same level of trust as the rest of TSP. This allows these portions to be logically and physically separated from the rest of TSP without effecting the underlying security of the system as a whole. The session manager functions include user identification and audit, session setup and termination, and issuing commands between the user interface and the dialog manager. The dialog manager functions control the data path established in the SNIU, including dialog identification and audit, dialog request validation, setup, and termination, applying and reviewing block headers for transmitted data, and issuing commands between the session manager and the association manager. The association manager functions control the transmission of data on the data path with a remote SNIU, including SNIU identification and audit, association request validation, setup, and termination, invoking and managing sealer keys for encrypting transmitted data, and issuing commands between the dialog manager and the network interface. The network interface functions allow the transmission of data and commands between the SNIU and the network.

The Security Manager (SM) performs network security functions, including security administration of the core manager functions of the SNIUs. In the preferred embodiment, the SM functions are distributed over three platforms, i.e., a SNIU hosted SNIU security agent (SSA), an area security manager (ASM), and a network security manager (NSM). The SSA exchanges data and commands with its assigned SNIU, and performs initialization, configuration control, access control, public key management, audit/alarms, and other services for the SNIU. The ASM manages the security functions for a group of SNIUs in a defined area. The NSM manages the security functions of the ASMs for the network as a whole.

DETAILED DESCRIPTION OF THE EXEMPLARY EMBODIMENTS

In the present invention, a secure network interface unit (SNIU) is used to control communications between a respective host or user computer unit and the network at a "session layer" of interconnection which occurs when a user on the network is identified and a communication session is to commence. For example, the industry-standard Open Systems Interconnection (OSI) model, defines seven layers of a network connection: (1) physical; (2) data link; (3) network; (4) transport; (5) session; (6) presentation; and (7) application. In the present invention, the network security measures are implemented at the Session Layer 5. The placement of security at the Session Layer allows existing network assets and existing network protocols at the Transport Layer 4 and lower to continue to be used, thereby avoiding the need to replace an installed network base for the implementation of the multi-level security system. The connected host or user equipment and the network backbone are therefore not required to be secure (trusted). Conventionally, OSI network applications employ CCITT X.215 which is a non-secure session layer protocol. None of the prior multi-level security systems employ the security measures described herein in the Session Layer.

Figure 1:
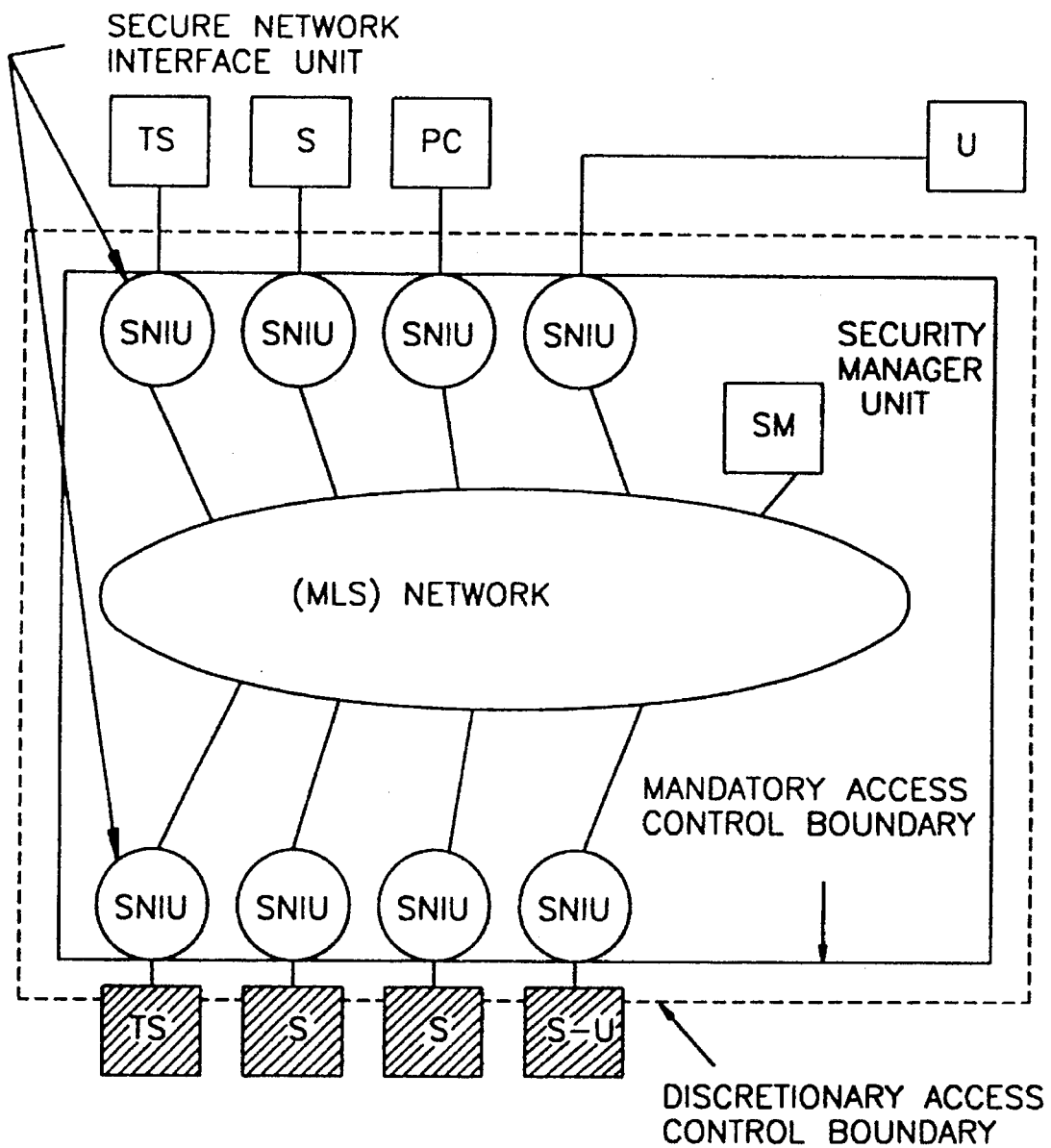
FIG. 1 is a schematic diagram of an MLS network system in accordance with the invention.

Referring now to FIG. 1, there is shown a network provided with a security system in accordance with the present invention. A plurality of host or user computer units, such as a terminal server TS, host unit S, host-server unit S-U, user unit U, or personal computer (PC), are coupled to a network through respective secure network interface units (SNIUs). Multi-user terminal, host or host server units are indicated by shaded squares, whereas single-user terminal, host personal computer, or user units are indicated by white squares. The SNIUs encapsulate the network with a ring of secure units which enforce both discretionary and mandatory security policies. The SNIUs provide security policy enforcement, a user communication release interface, controlled communication flow when interconnected to non-secure other networks, and session security protocols. The discretionary security policies are indicated as extending to the multi-user computer units which generally have some form of discretionary user access control.

The SNIU is capable of passing digital data, voice and video traffic so as to provide the full functionality required for a Trusted Session Protocol (TSP). The TSP uses the facilities of the lower level protocols to transmit data across the network. To this end, and to provide flexibility, the specialized network interface SNIU is designed to allow coupling of the TSP with existing (non-secure) equipment and underlying network.

A security administration architecture, which includes a security manager SM coupled to the network, provides user accountability, configuration management, security administration and alarm handling, and sealer (cryptographic) key management. A host unit is not required to be trusted as the SNIU prevents any traffic not destined for the host from getting to the host. The network is not required to be trusted as the SNIU prevents unauthorized data on the network from getting to or from the host.

Figure 2:
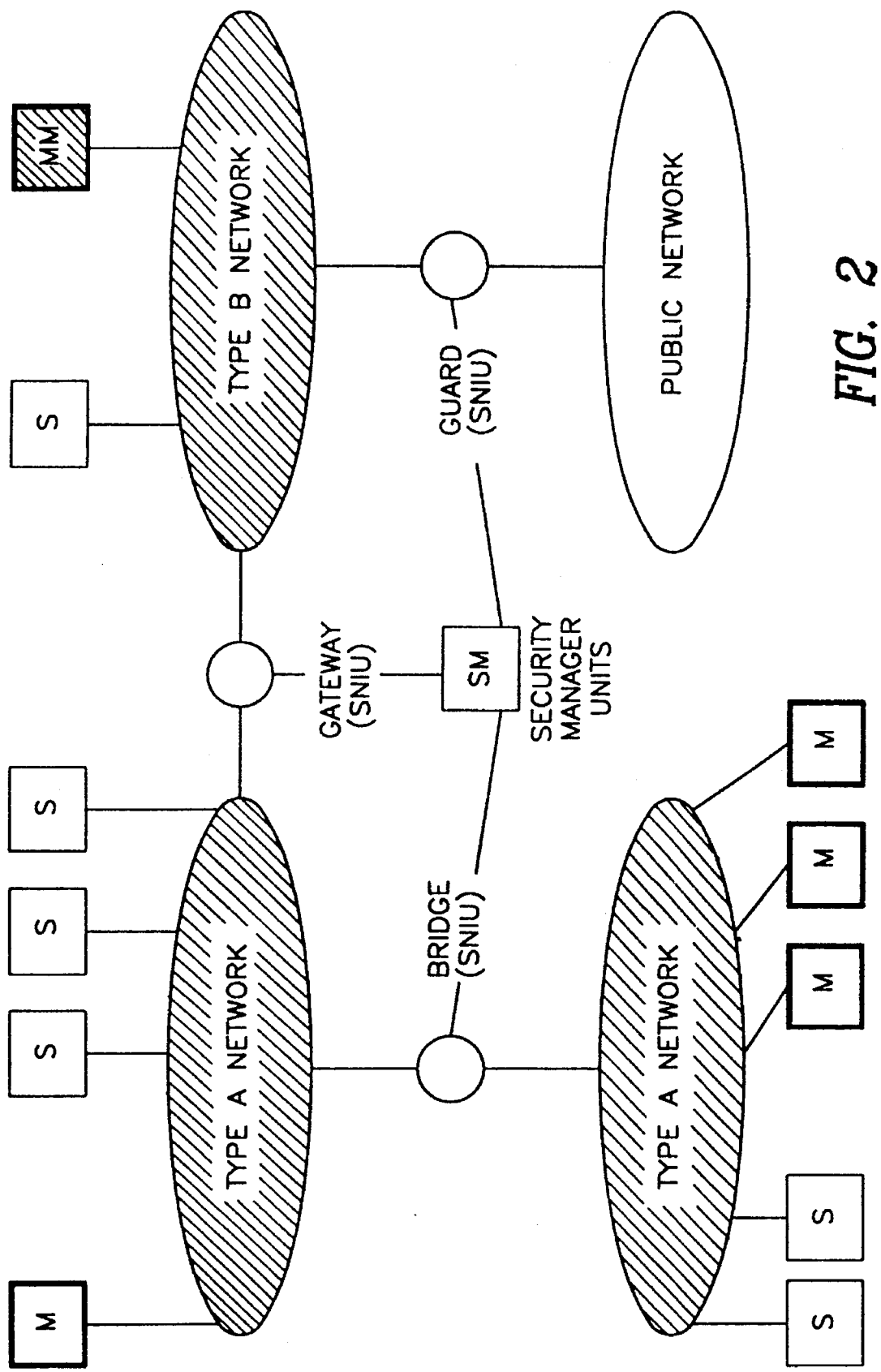
FIG. 2 is a schematic diagram of a variation of the inventive concept as applied to an internetwork system.

Referring to FIG. 2, a variation is shown employing SNIUs for internetwork connections. A bridge SNIU is used between two private networks (shaded ovals) using the same security labeling semantics but which operate at two different protection levels. The networks may be controlled by a single network security manager SM, or each network can have its own security manager SM. A gateway SNIU is used between two networks using different security labeling semantics, for example, a Type A network may use labels (Top Secret, Secret, Confidential, Unclassified) and a Type B network may use the labels (Most Secret, Secret, Restricted, Confidential, Releasable). A guard SNIU is used to support communications between a private network and a public network.

The network security system of the invention is divided into two major functional areas: the Trusted Session Protocol (TSP) hosted by the SNIU, which is responsible for the management of the data path and the passing of data; and the Security Management architecture, consisting principally of the Security Manager (SM), which is responsible for security management of the network.

Figure 3A:
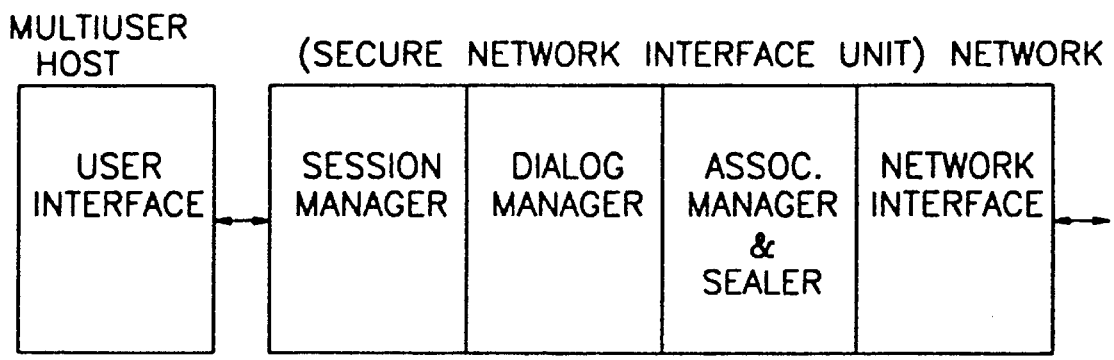
FIGS. 3A, 3B, and 3C are schematic diagrams of a secure network interface unit (SNIU) in accordance with the invention.
Figure 3B:
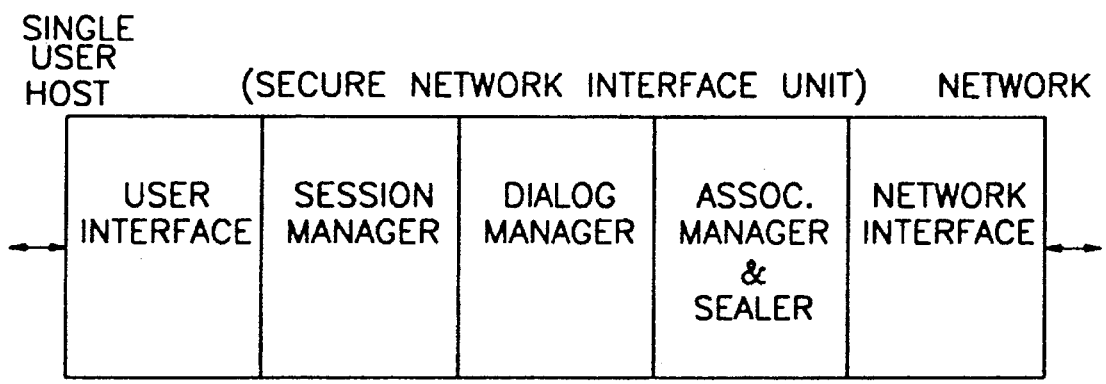
Figure 3C:
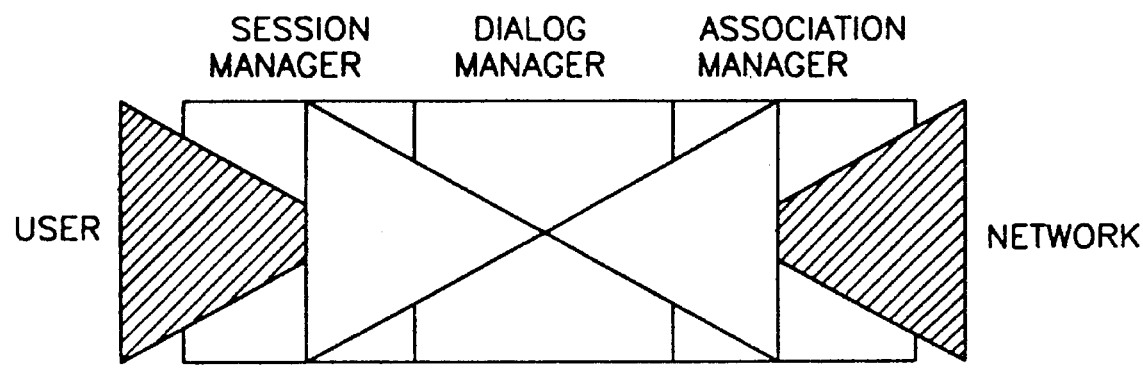

The configuration of the TSP varies with the SNIU environment. As shown in FIG. 3A, the SNIU for a multi-user host includes a Session Manager module, a Dialog Manager module, an Association Manager & Sealer module, and a Network Interface. A User Interface is provided with the multi-user host. In FIG. 3B, the SNIU of a single-user host incorporates the User Interface with the other functions. As illustrated conceptually in FIG. 3C, the communication interface with the user is mediated by Session Manager, the interface with the network by the Association Manager, and the communication flow between the two ends by the Dialog Manager.

For multi-user computers, incorporation of the User Interface with the host computer opens the memory resources of the host to provide message boxes for all authorized users. The message boxes are protected by the discretionary access control policies of the host. In the special case of a personal computer (PC), a multi-level release option may be provided which allows the sending of messages at a security level below the level at which the PC is operating. An interface to the SNIU is required to allow the operator to review the message before release.

SECURITY SYSTEM POLICIES

The security system of the present invention may implement a number of security policies suitable to the circumstances of a given network environment. The major policy areas are: discretionary access control; mandatory access control; object reuse; labeling; identification and authentication; audit; denial of service detection; data type integrity; cascading control; and covert channel use detection.

Discretionary access control is a means of restricting access to objects (data files) based on the identity (and need to know) of the user, process, and/or group to which the user belongs. It may be used to control access to user interface ports based on the identity of the user. For a single-user computer unit, this mechanism may be implemented in the SNIU, whereas for a multi-user host, the DAC control may be implemented at the host machine. Discretionary access control may also be implemented as discretionary dialog addressing, wherein the addressing of all communications originated by a user is defined, and for user discretionary access denial, wherein a user may refuse to accept a communication from another user.

Mandatory access control is a means of restricting access to objects based on the sensitivity (as represented by a classification label) of the information contained in the objects, and the formal authorization (i.e., clearance) of the user to access information of such sensitivity. For example, it may be implemented as dialog lattice-based access control, wherein access requires a correct classification level, integrity level, and compartment authorization, dialog data-type access control, wherein correct data type authorization is required for access, and cascade protection, wherein controls are provided to prevent unauthorized access by cascading user access levels in the network.

Object reuse is the reassignment and reuse of a storage medium (e.g., page frame, disk sector, magnetic tape) that once contained one or more objects to be secured from unauthorized access. To be secured, reused, and assigned to a new subject, storage media must contain no residual data from the object previously contained in the media. Object reuse protection may be implemented by port reuse protection, session reuse protection, dialog reuse protection, and/or association reuse protection.

Labeling requires that each object within the network be labeled as to its current level of operation, classification, or accreditation range. Labeling may be provided in the following ways: user session security labeling, wherein each user session is labeled as to the classification of the information being passed over dialog labeling, wherein each dialog is labeled as to the classification and type of the information being passed over it; and host accreditation range, wherein each host with access to the secured network is given an accreditation range, and information passing to or from the host must be labeled within the accreditation range.

Identification is a process that enables recognition of an entity by the system, generally by the use of unique user names. Authentication is a process of verifying the identity of a user, device, or other entity in the network. These processes may be implemented in the following ways: user identification; user authentication; dialog source authentication, wherein the source of all communication paths is authenticated at the receiving SNIU before communication is allowed; SNIU source authentication, wherein the source SNIU is authenticated before data is accepted for delivery; and administrator authentication, wherein an administrator is authenticated before being allowed access to the Security Manager functions.

An audit trail provides a chronological record of system activities that is sufficient to enable the review of an operation, a procedure, or an event. An audit trail may be implemented via a user session audit, a dialog audit, an association audit, an administrator audit, and/or a variance detection, wherein audit trails are analyzed for variance from normal procedures.

Denial of service is defined as any action or series of actions that prevent any part of a system from functioning in accordance with its intended purpose. This includes any action that causes unauthorized destruction, modification, or delay of service. The detection of a denial of service may be implemented for the following condition: user session automatic termination, such as when unauthorized access has been attempted; user machine denial of service detection, such as detection of a lack of activity on a user machine; dialog denial of service detection; association denial of service detection, such as detection of a lack of activity between SNIUs; and/or data corruption detection, such as when an incorrect acceptance level is exceeded.

Covert channel use is a communications channel that allows two cooperating processes to transfer information in a manner that violates the system's security policies. Detection of covert channel use may be implemented, for example, by delay of service detection, such as monitoring for unusual delays in message reception, or dialog sequence error detection, such as monitoring for message block sequence errors.

The functions of the "Trusted Session Layer Protocol" (TSP) performed by the secure network interface unit (SNIU) and the security management (SM) architecture will now be described. These functions are designed to implement many of the security policies described above. It is to be understood that these functions are only illustrative examples of a wide range of security functions that can be implemented using the SNIU/TSP and SM architecture.

Trusted Session Layer Protocol (TSP) and SNIU

The main functions of the TSP are to set up paths for data, terminate paths for data, pass data over established paths, and enforce security policies as directed by the SM. Secondary functions of the TSP include interacting with the user machine, identifying the user and providing a data path between the user machine and the SNIU, identifying the user process and providing a secure data path between local and remote SNIUs, protecting data transiting the data path, and interacting with the network.

To accomplish these functions, the TSP is divided into six sublayers: the User Interface; the Session Sublayer (Manager); the Dialog Sublayer (Manager); the Association (Manager) and Data Sealer Sublayer; and the Network Interface. FIGS. 4A–4F illustrate the operation at each of these sublayers in greater detail. For purposes of the following description, a session is defined as a period of authorized network usage in which a user who conducts a dialog has been identified and verified. A dialog defines a data path between a pair of processes. An association defines a data path between a pair of SNIUs, including any data sealer keys used in securing the data.

Figure 4A:
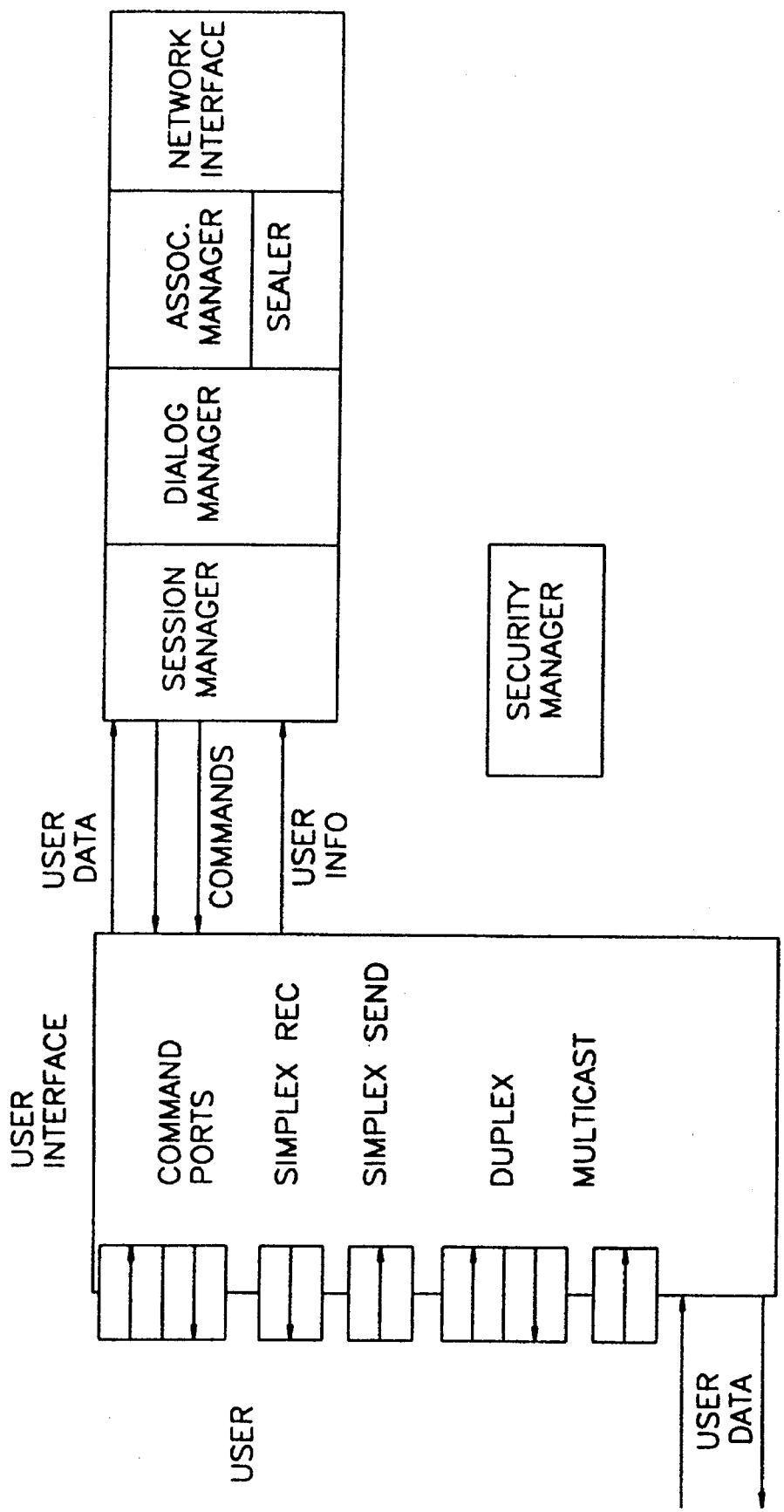
FIGS. 4A–4F are schematic diagrams of the data and command structure of the SNIU unit.

In FIG. 4A, the User Interface provides the means for the user to access the network. For multi-user hosts, the User Interface may reside within the host machine, whereas for single-user machines, the User Interface may reside within the SNIU coupling the user machine to the network. Communication with the network is provided via a number of command ports, simplex receiving and sending ports, duplex ports, and a multicast send port. Multiple ports can be set up for each user. The User Interface communicates only through the Session Manager. It can perform the following functions: translating data from the format used in the user machine to the format used in the SNIU; passing data between the user machine and the SNIU; providing ports for communication between the user and the network through the SNIU; providing user information to the Session Manager; equalizing data loads when connected to a number of SNIUs; port management on command from the Session Manager; and discretionary access control.

Figure 4B:
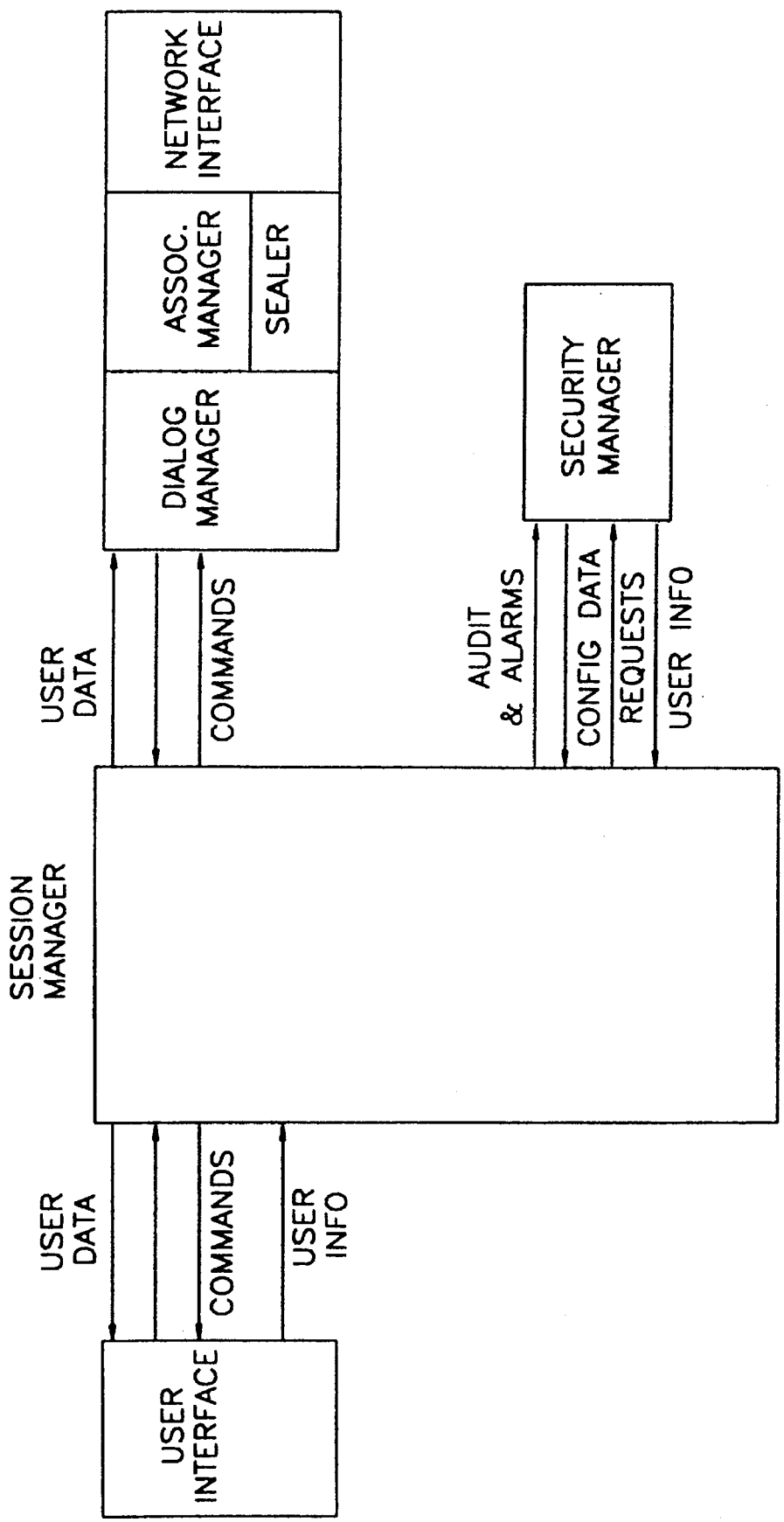

In FIG. 4B, the Session Manager manages the sessions with users. The Session Manager communicates with the User Interface, the Dialog Manager, and the SNIU Security Manager (SSM). The Session Manager has the following functions: user identification; audit; alarms; session setup and termination; session time out, wherein inactive sessions are terminated after a given amount of time; accepting session access requests to an existing session from a remote SNIU; commands to the Dialog Manager; maintenance of user access settings (passwords, access lists); passing data over an existing dialog between the User Interface and the Dialog Manager; and management of the User Interface, including commands for reinitialization, termination, and creation and deletion of ports.

Figure 4C:
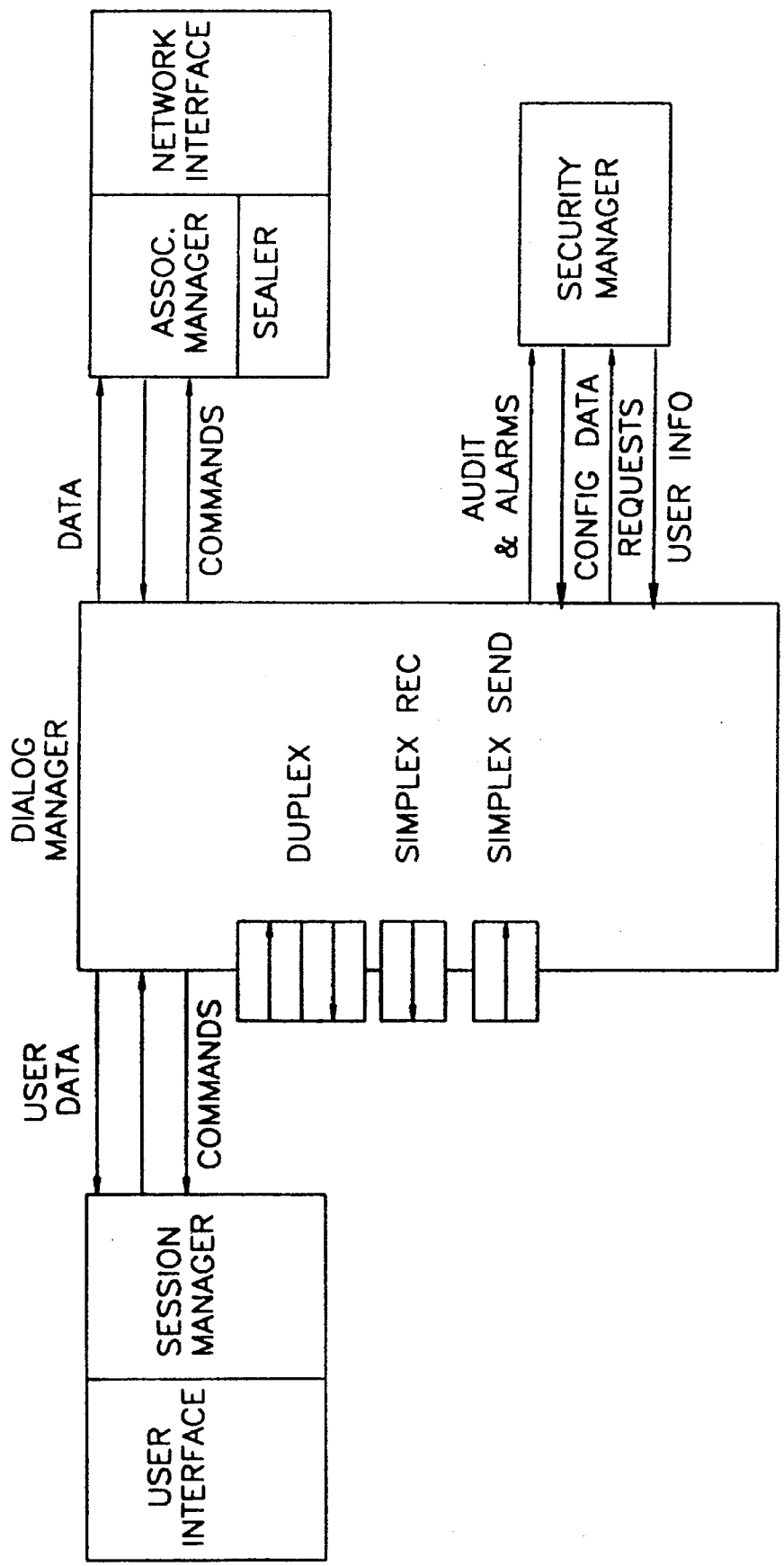

In FIG. 4C, the Dialog Manager supports duplex, simplex receive, simplex send, and multicast dialogs. The Dialog Manager communicates with the Session Manager, the Association Manager, and the SSM. During the establishment of a communications path, both discretionary and mandatory access control mechanisms are used to assure that there is no security compromise. The Dialog Manager includes the following functions: dialog setup and termination; accepting a request to initiate or terminate a dialog from a remote SNIU; validating a dialog request using user access lists and process classifications; audits; alarms; assigning local dialog numbers and obtaining network dialog numbers from a remote SNIU; identification of processes involved in a dialog; passing data over an existing association between the Session Manager and the Association Manager; applying and validating block headers for transmitted data; issuing commands to the Association Manager; requesting the SSM to validate user data; mapping dialog numbers to assigned port numbers; and acknowledging the receipt of block data transmissions.

Figure 4D:
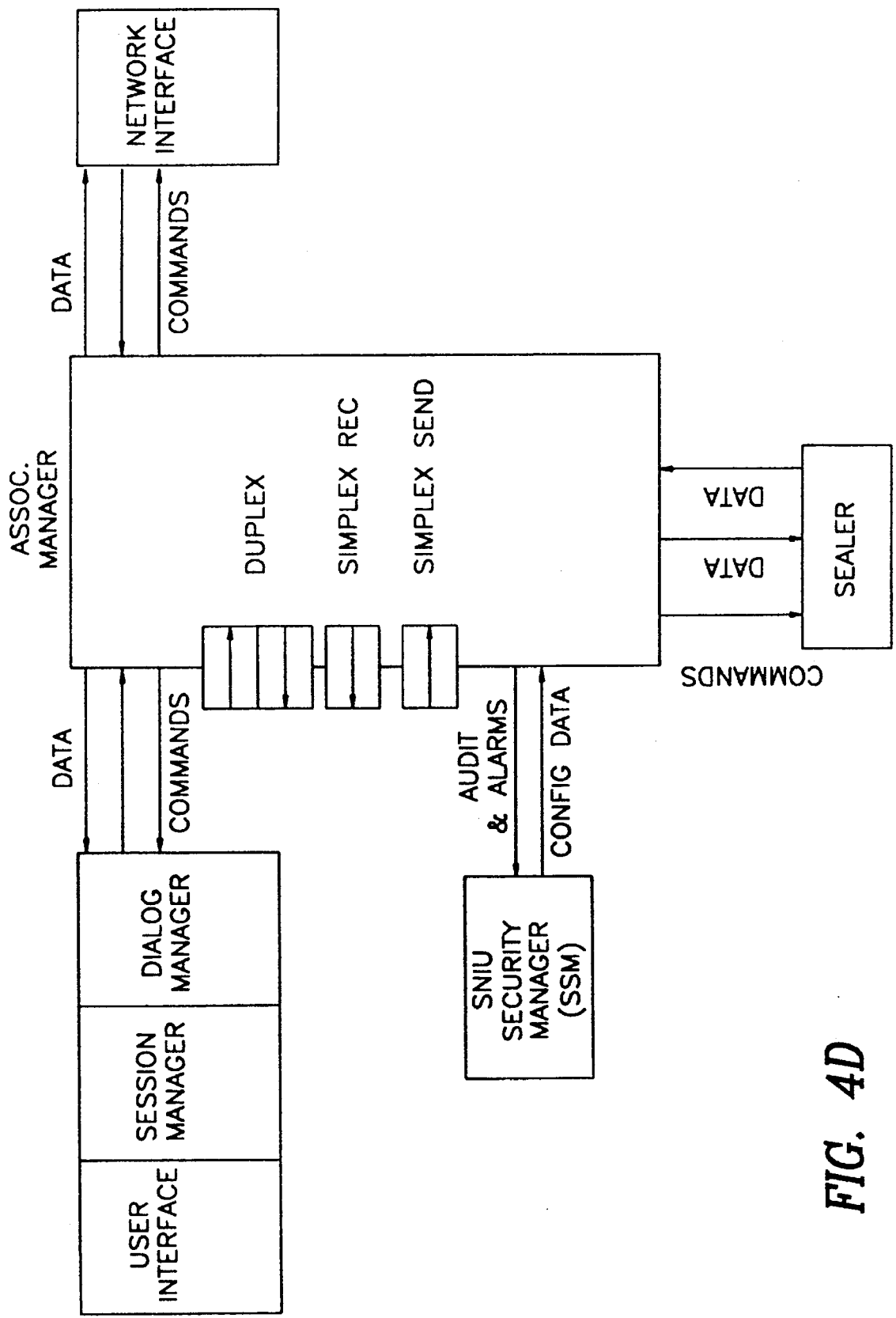

In FIG. 4D, the Association Manager supports duplex, simplex send, and simplex receive associations with remote SNIUs. The Association Manager communicates with the Dialog Manager, the Sealer, and the SSM. It has the following functions: association setup and termination; accepting a request to initiate or terminate an association from a remote SNIU; validating an association request according to the security policies of the network; audits; alarms; identifying remote SNIUs; passing data with other SNIUs over network facilities; invoking the Sealer and managing sealer keys for encrypting transmitted data; and issuing commands to the Network Interface.

Figure 4E:
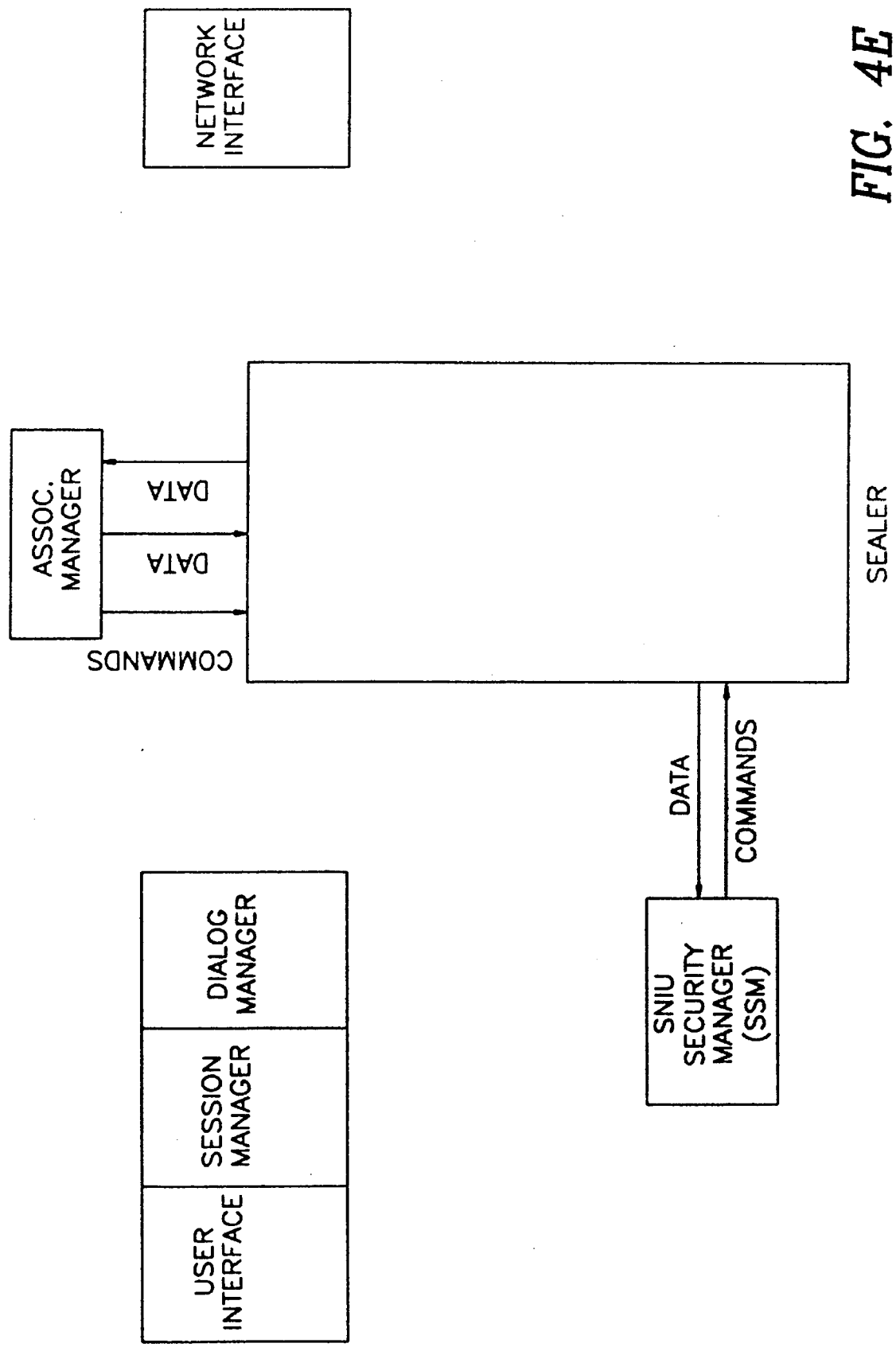

In FIG. 4E, the Sealer communicates with the Association Manager and the SSM, and has the following functions: storing all keys used in sealing data; performing the sealing and unsealing algorithms (e.g., key exponentiation) on a data block upon command from the Association Manager; and generating new keys for the SNIU upon command from the SSM. The Association Manager, in conjunction with the Sealer, provides integrity protection and assures that the data is delivered to the correct destination. The Sealer uses keys to transform the entire data block. Alternatively, one could perform a sum check on the data and seal the sum check as is known in the art. When the data block is passed through the Sealer or a MDC upon reaching its destination, the block is unsealed. Any remaining errors are considered security events.

Figure 4F:
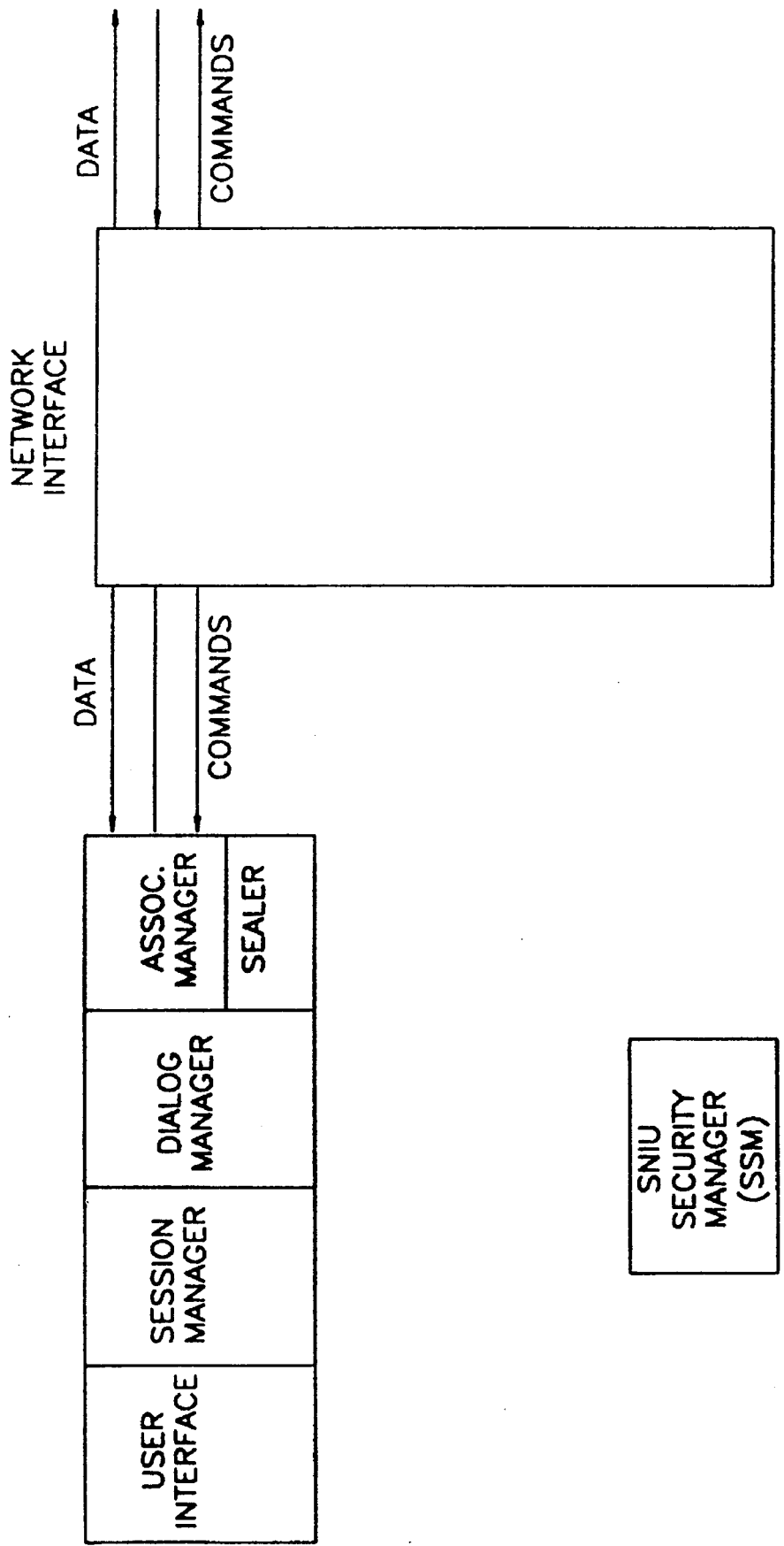

In FIG. 4F, the Network Interface to the network communicates only with the Association Manager, and has the following functions: passing data and information between the Association Manager and the network; and passing commands from the Association Manager to the network.

Security Management Architecture and SM

Figure 5A:
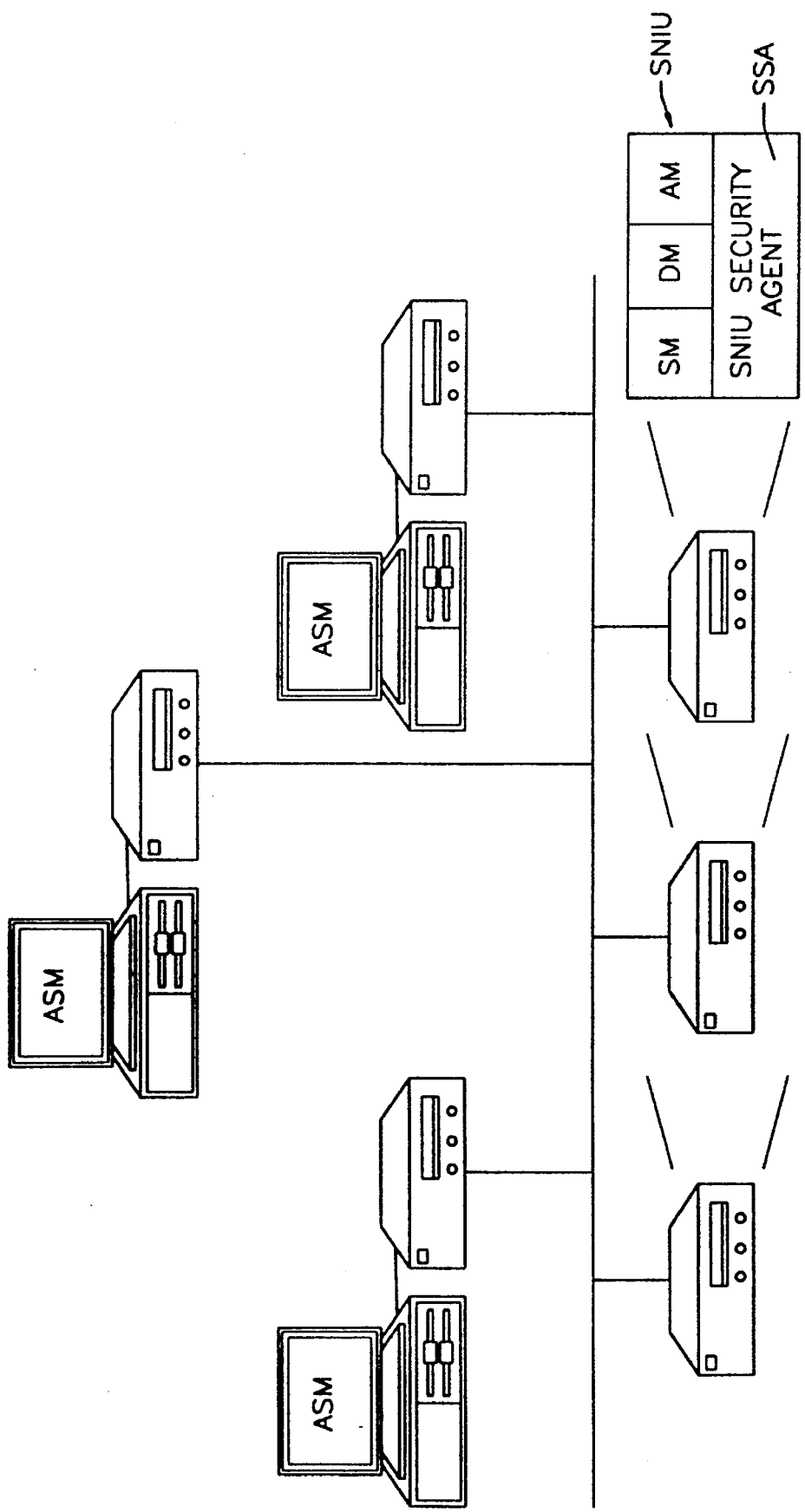
FIGS. 5A–5D are schematic diagrams of a security management architecture in the present invention.

The security management architecture includes the Security Manager (SM) which performs the network security functions. As illustrated in FIG. 5A, the SM functions are distributed over three platforms: a SNIU security manager (SSM); an area security manager (ASM); and a network security manager (NSM). The distributed platforms provide fault tolerance to the security system. The SM platforms communicate with each other using the TSP described above. The SM's primary functions include system initialization, network recovery, network expansion/contraction, audit/alarms, key management, configuration control, access control, system administration, directory services, time coordination, and internetwork support.

For system initialization, initial keys, element identifications, and software loadings must be generated and distributed to the subordinate elements of the network system. SNIUs must be initialized. All initial network topology information must be entered into the system. The network is initialized by subordinate elements establishing dialogs with their primary controlling agents. Under this approach, each of the SNIUs will be powered up, keyed, then will seek to establish a dialog with its assigned ASM. If unsuccessful, the SNIU may periodically attempt to establish a dialog with the primary or an alternate ASM until it has succeeded. After successful setup, the operational configurational information is downloaded to the respective SNIUs. The ASMs are initialized in an analogous manner by the NSM. Initialization of the system elements from the bottom up eliminates unnecessary network overhead.

In the event of single ASM failures, the network can continue to operate virtually unaffected. Automatic procedures are effected for switchover to an alternate ASM or re-entry of a failed ASM. The affected SNIU seeks an alternate ASM, establishes a new association, and uploads the current configuration data. For re-initialization of an ASM, the ASM attempts to come on line, negotiates SNIU pairings with all other ASMs, establishes associations with the assigned SNIUs, and commands the SNIUs to switch to a new primary agent. Similar procedures are used for new assignments in network expansion or contraction.

Figure 5B:
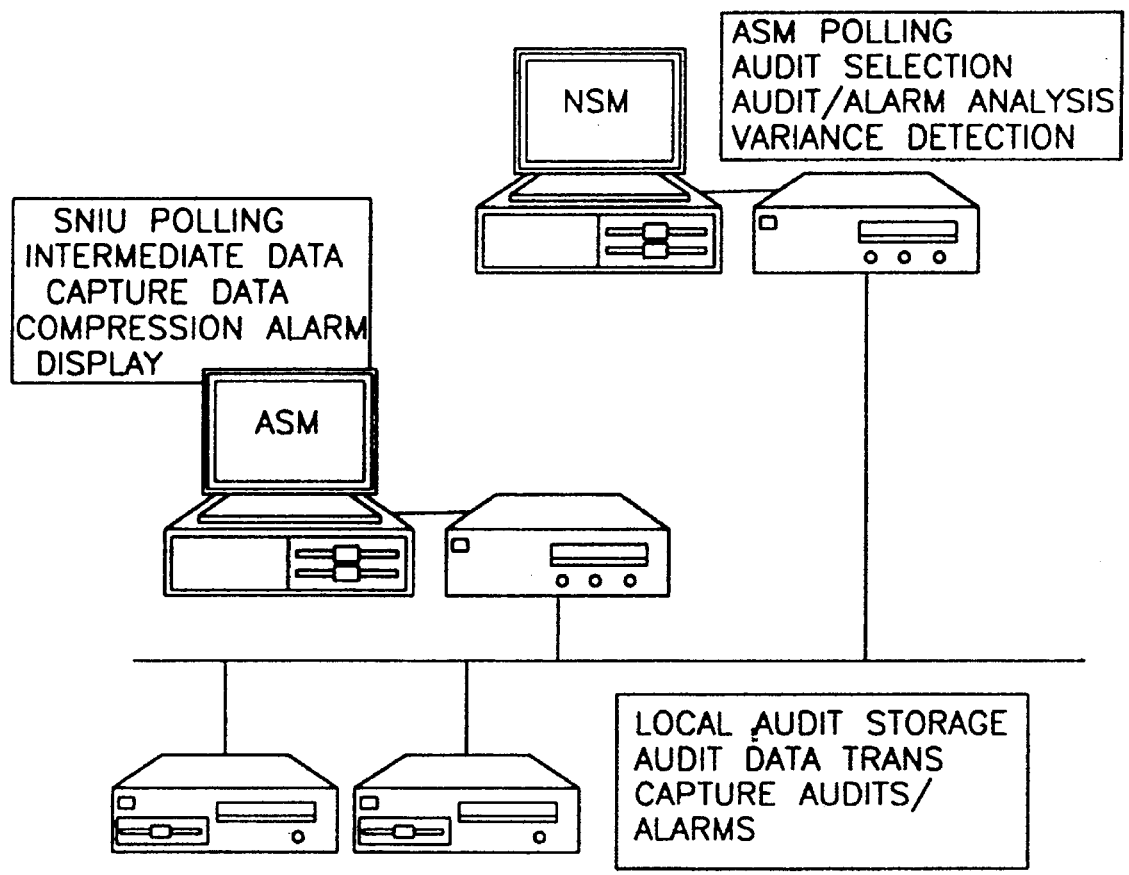

The SM also collects and stores the audit information generated by the SNIUs in response to the SM's criteria. As illustrated in FIG. 5B, audit data are captured locally at the SNIUs, collected at the intermediate ASMs, and analyzed centrally at the NSM. The SM also detects when an alarm has occurred and determines the most appropriate action to take to resolve the problem. When no automated solution is possible, the SM presents the problem to the security administrator for resolution.

Figure 5C:
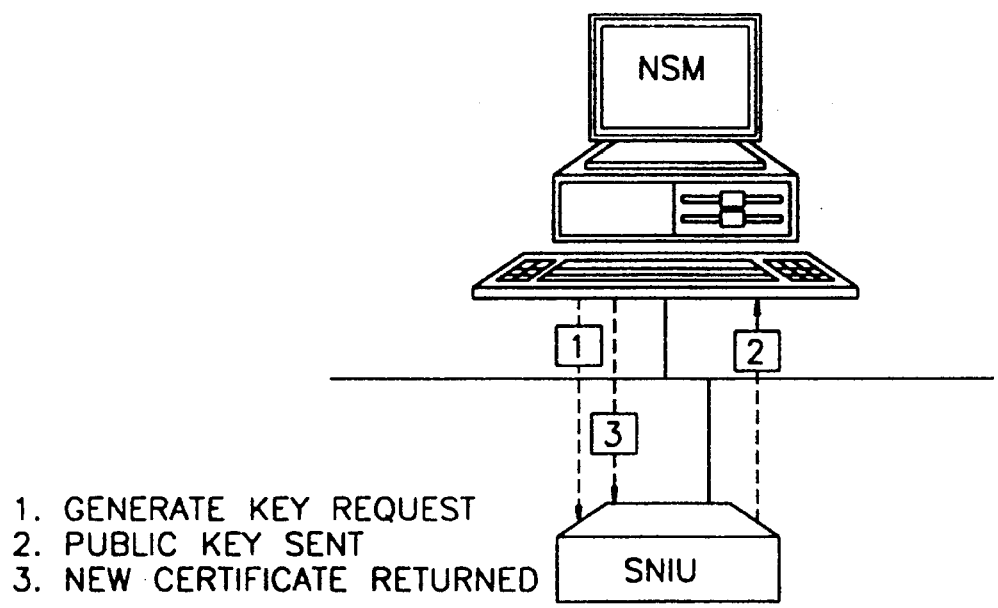

For key management, the SM is responsible for the generation, distribution, accounting, and destruction of key certificates that ensures the system integrity. As illustrated in FIG. 5C, the NSM generates initial RSA key pairs and certificates. The SNIU sends a public key in response to a NSM key request. The NSM returns a new certificate if the public key is validated. In addition, the NSM dictates when keys are to be generated by the SNIUs. The SNIUs contain all the hardware and algorithms necessary to generate the key pairs. With the exception of the initial key pairs, the secret keys will not be known outside of the local SNIU.

For configuration control, all system elements are responsible for maintaining the operational configuration information necessary for establishing and continuing secure communications. A hierarchy of privileges is maintained, including: host privileges, such as host accreditation range, SNIU addresses, classification of host, host name, and data type authorizations; user/applications privileges, such as user/application authorization range, host association, data type authorization, user application name, and user audit switch; and SNIU privileges, such as SNIU ID/type, network address, audit event selection list, user list, and accreditation range.

The SM can support full system administration capabilities to the network, including health and status polling, privilege management, and backup management. As in the case of audits described above, the status data is captured locally at the SNIUs, collected at the intermediate level of the ASMs through polling, then analyzed for re-assignments at the NSM.

Figure 5D:
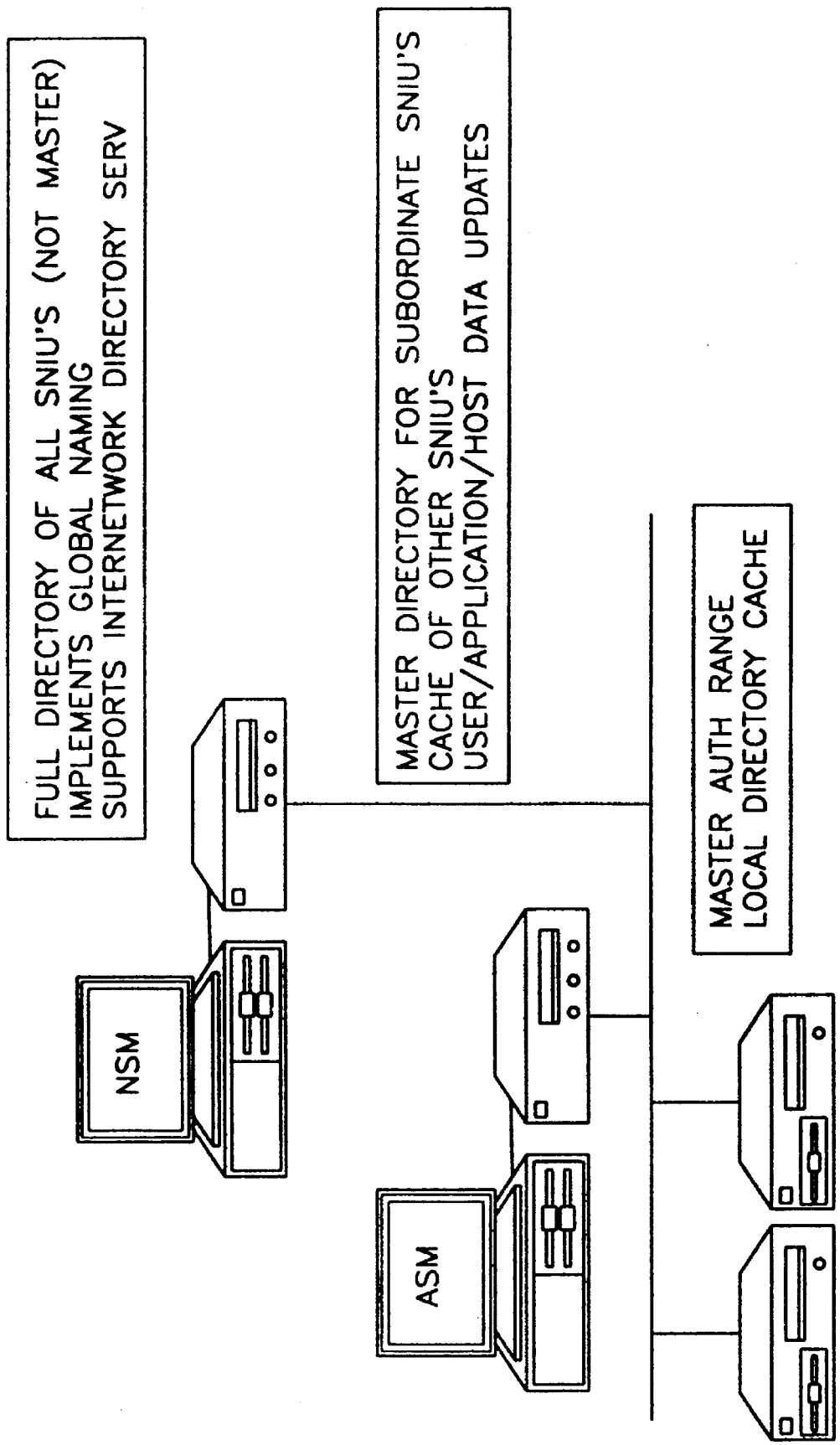

The SM also provides directory services to the TSP in support of association setup, as illustrated in FIG. 5D. A directory resides on a primary ASM for a given SNIU. When the SNIU requires access to another SNIU, the ASM is queried for the information. If it does not exist at that ASM, the ASM broadcasts an information request to all other ASMs. The NSM maintains a full directory that is subordinate to and updated from the ASMs. Each ASM maintains a master directory for its subordinate SNIUs, and a cache directory for a smaller set of connections requested by its subordinate SNIUs. Each SNIU maintains a cache of directory entries associated with the most recent connections.

For internetwork support, the SM can provide services such as an internetwork directory, internetwork digital signature support, and negotiation of security policies/semantic. In a bridge SNIU, after a user is located on an alien network of similar security semantics, all users are provided the address of the bridge SNIU for communications. A gateway SNIU is similar to a bridge SNIU with the exception of the requirement to determine the semantic equivalents. In addition, the gateway SNIU is initialized and controlled by two NSMs. When communicating to an alien (non-secure) network, the guard SNIU treats the alien network as a large host. However, no user responsibility is expected on the alien network. The guard SNIU provides the security and connectivity only to the network, not any remote host.

Examples of System Implementation

In order to illustrate the establishment of a connection using the protected Trusted Session Layer protocol (TSP) of an SNIU between a user or host computer and a network, either of which may be non-secured, the following example of a path setup for a communication on the network is described in step-by-step fashion. In an actual implementation, the user host is a VT320 terminal of Digital Equipment Corporation. The communication link is a RS-232 serial line, at a line speed of 9600 bits/sec. The User Interface resides within the SNIU. The network is a TCP/IP Ethernet LAN. The Network Interface resides in the SNIU and is connected to the network by a Racal/Interlan TCP/IP Ethernet card (Model NP627).

Figure 6A:
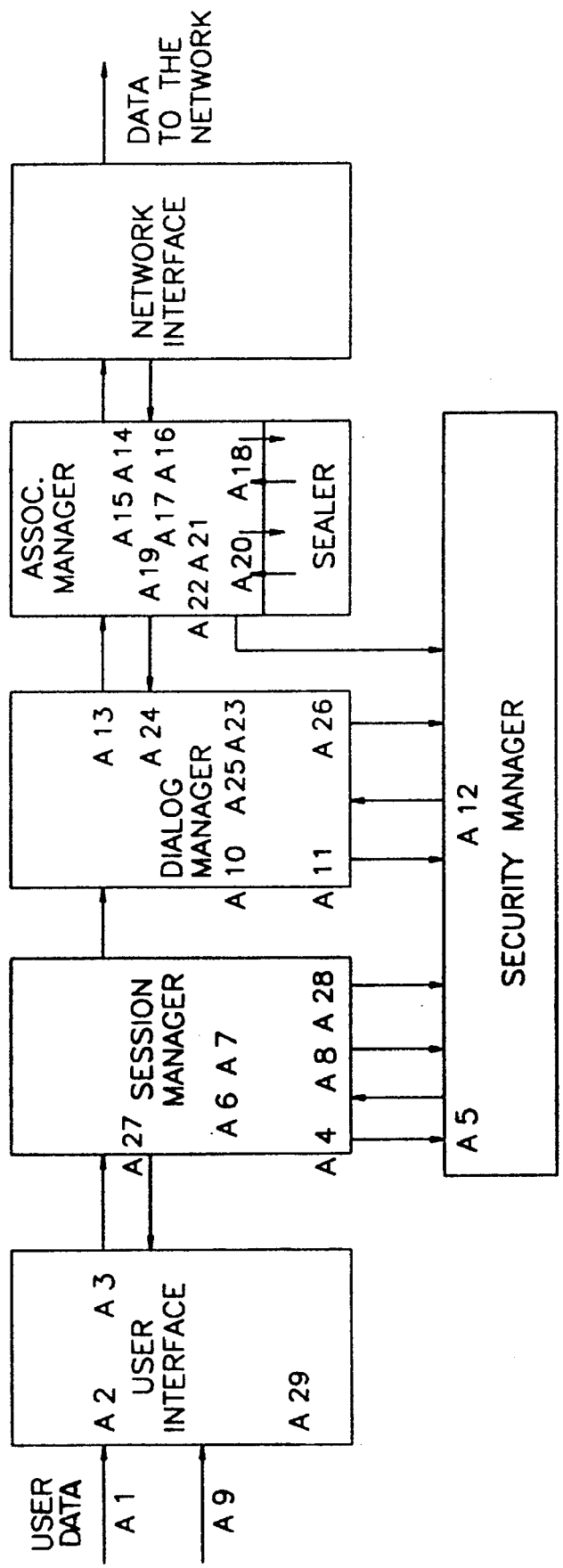
FIGS. 6A and 6B illustrate the steps for a path setup in accordance with the MLS system of the present invention.

In FIG. 6A, the steps for a path setup by a sender are illustrated. At A1, the user requests a session before being granted access to the network. The User Interface translates the data at A2, and provides the user information to the Session Manager at A3. The Session Manager requests user information from the Security Manager at A4, and the Security Manager returns the information at A5. The Session Manager validates the user at A6, then sets up a session at A7. If unable to validate the user, an audit message is generated and the user is denied access. The Session Manager sends an audit message of the session setup to the Security Manager at A8.

The user then sends a dialog request at A9. The Dialog Manager identifies the sending process at A10, and requests destination information from the Security Manager at A11, which the Security Manager provides at A12. The Dialog Manager then issues an association setup command to the Association Manager at A13. The Association Manager sends out a certificate at A14 and an association setup message at A15 to the destination on the network. The Association Manager then receives a return certificate from the remote SNIU of the destination address at A16 and an association setup acknowledgement at A17. The Association Manager commands the Sealer to unseal the certificate at A18 and validates the unsealed certificate at A19. The Association Manager commands the Sealer to unseal the association setup acknowledgement at A20 and sets up the association at A21. The Association Manager then sends an audit message to the Security Manager at A22.

The Dialog Manager selects a dialog number and type and sends a request to the remote SNIU at A23, and receives the number and type acknowledgement at A24. The Dialog Manager accepts the dialog at A25, then sends an audit message to the Security Manager at A26. The Session Manager commands creation of a port for the dialog at A27, then sends an audit message to the Security Manager at A28. The User Interface creates a port for the dialog at A29, whereupon the transmission of the requested communication can take place.

Figure 6B:
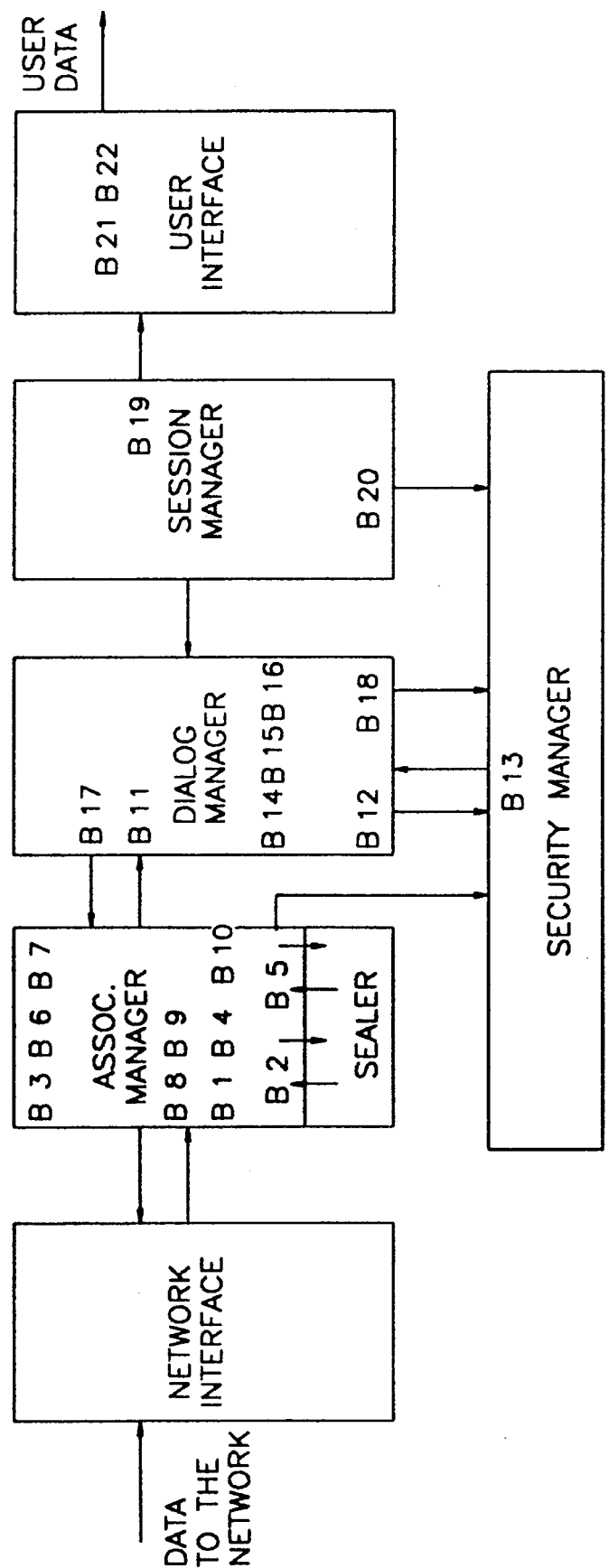

In FIG. 6B, the steps for the path setup of the receiving SNIU are shown. The Association Manager receives the certificate of the sending SNIU at B1, commands the Sealer to unseal it at B2, and validates it at B3. It also receives the association setup message at B4, commands the Sealer to unseal it at B5, validates the association at B6, sets up the association at B7, sends a return certificate to the sending SNIU at B8 and an acknowledgement message at B9, then sends an audit message to the Security Manager at B10. The Dialog Manager receives the dialog set up request from the Association Manager at B11, requests user information from the Security Manager at B12, which is provided at B13, identifies the local process at B14, validates the dialog request at B15, accepts the dialog at B16, sends the dialog number and type acknowledgement to the Association Manager at B17 and an audit message at B18. The Session Manager commands a port for the dialog at B19 and sends an audit message at B20, whereupon the User Interface responds at B21 and begins to translate data for the user at B22.

The SNIU may be implemented in the form of a software program executed on a general purpose computer coupled as a server between a host machine and the network. Alternatively, it may be programmed as a network communications program resident in and executed from the host machine. However, for security purposes, the preferred form of the SNIU is a closed module having the security program functions resident in ROM and executed by a dedicated microprocessor. The closed module can incorporate the communications link or modem to the network.

The SSM may be a software program co-resident with the SNIU program at a host site, or may be executed on a separate computer unit connected to the SNIU through the network. The ASM may be a software program co-resident with an SSM at a large host site, or may be executed on a separate computer unit for an area connected to the assigned SSMs through the network. The NSM is preferably operated from a separate, secure computer unit connected to the network and operated by the overall security administrator. The particular physical locations and forms of implementation for the SNIUs and distributed platforms of the SM may vary depending upon the network configuration, desired security policies, and user audience.

It is to be will be understood that the embodiments described herein are merely exemplary of the principles of the invention, and that a person skilled in the art may make many variations and modifications without departing from the spirit and scope of the invention. All such variations and modifications are intended to be included within the scope of the invention as defined in the appended claims.

We claim:

1. A multi-level network security apparatus for a computer network having at least one user coupled thereto, the at least one user selected from a group consisting of a host computer and at least a second network, comprising:

a secure network interface unit (SINU) coupled between said at least one user and the computer network which operates at a user layer communications protocol, said SINU comprising:

a user interface for providing an interface between the user and SNIU, said user interface being operative for translating data received from the user into a format used by said SNIU, a session manager for identifying a user requesting access to the network at the session level and verifying if the identified user is authorized for access to the network, managing functions of communications sessions permitted by said network security apparatus and maintaining a session audit, a dialogue manager for controlling a data path established in the SNIU, and an association manager which operates to establish and control a user session at a session layer of interconnection between the user and the network through said SNIU if said identified user is verified for access, whereby the SNIU is implemented to create a global security perimeter for end-to-end communications and wherein the network may be individually secure or non-secure without compromising security of communications within said global security perimeter; and a security management architecture, including a security manager (SM) connected to said SNIU for causing said SNIU to be operated and configured for protecting the security communications transmitted through said SNIU between the at least one user and the network, said SM capable of implementing a security policy selected from the group consisting of discretionary access control, mandatory access control, object reuse, labeling, denial of service detection, data type integrity, cascading control and covert channel use detection, said SM further providing inter-network administration.

2. A network security apparatus according to claim 1, wherein said SNIU includes means for performing a defined trusted session layer protocol (TSP), said TSP constituting said user layer communications protocol.

3. A network security apparatus according to claim 1, wherein said SM architecture supports said security policy in at least two network jurisdictions.

4. A network security apparatus according to claim 1, wherein said SNIUs operate to prevent covert information flow within said global security perimeter.

5. A network security apparatus according to claim 1, wherein said SNIU includes a data sealer for validating data transmitted through said SNIU.

6. A network security apparatus according to claim 1, wherein said SNIU includes a network interface for interfacing said SNIU with the network.

7. A network security apparatus according to claim 1, wherein said SM architecture includes means for performing network security functions, including security administration of the functions of one or more SNIUs to which said SM is connected.

8. A network security apparatus according to claim 7, wherein said means for performing said SM functions are distributed over three platforms, i.e., a SNIU security manager (SSM), an area security manager (ASM), and a network security manager (NSM).

9. A network security apparatus according to claim 8, wherein said means for performing said SM functions of said SSM include exchanging data and commands with the SNIUs, and performing initialization, configuration control, access control, sealer key management, audit/alarms, and other services for the SNIUs.

10. A network security apparatus according to claim 8, wherein said means for performing said SM functions of said ASM include managing the security functions for a group of SNIUs in a defined area.

11. A network security apparatus according to claim 8, wherein said means for performing said SM functions of said NSM include managing the security functions of the ASMs for the network as a whole.

12. A method of providing multi-level network security for a computer network having at least one user coupled thereto, the at least one user selected from the group consisting of a host computer and at least a second computer network, comprising the steps of:

coupling a secure network interface unit (SINU) between the user and the network, said SNIU performing a plurality of security management functions including:

identifying a user requesting access to the network and providing an interface between the user and said SNIU, said user interface being operative for translating data received from the at least one user into a format used by the SNIU, verifying if the identified user is authorized for access to the network, managing functions of communications sessions permitted by said network security apparatus and maintaining a session audit, controlling a data path established in the SNIU, and establishing a user session at a session layer of interconnection between the user and the network through said SNIU if said identified user is verified for access;

whereby the SNIU is implemented to create a global security perimeter for end-to-end communications and wherein the network may be individually secure or non-secure without compromising security of communications within said global security perimeter; and providing a security management architecture, including a security manager (SM) connected to said SNIU, for performing the functions of controlling the operation and configuration of said SNIU in order to protect the security communications transmitted through said SNIU between the user and the network, said SM being capable of implementing a security policy selected from the group consisting of discretionary access control, mandatory access control, object reuse, labeling, denial of service detection, data type integrity, cascading control and covert channel use detection, said SM further providing inter-network administration.

13. A method of providing network security according to claim 12, wherein said SNIU performs the further step of establishing a defined trusted session layer protocol (TSP) through said SNIU.

14. A method of providing network security according to claim 12, wherein said step of providing an SM architecture includes the substep of supporting a plurality of security policies implemented in at least two network jurisdictions.

15. A method of providing network security according to claim 12, wherein said SNIU performs the further step of providing a data sealer for protecting data transmitted between SNIUs across one or more networks.

16. A method of providing network security according to claim 12, wherein the step of providing said SM functions includes the substep of providing security administration of the functions of one or more SNIUs to which said SM is connected.

17. A method of providing network security according to claim 16, wherein the step of providing said SM functions include the substep of distributing said SM functions over three platforms, i.e., a SNIU security manager (SSM), an area security manager (ASM), and a network security manager (NSM).

18. A method of providing network security according to claim 17, wherein said SM functions of said SSM include exchanging data and commands with the SNIUs, and performing initialization, configuration control, access control, sealer key management, audit/alarms, and other services for the SNIUs.

19. A method of providing network security according to claim 17, wherein said SM functions of said ASM include managing the security functions for a group of SNIUs in a defined area.

20. A method of providing network security according to claim 17, wherein said SM functions of said NSM include managing the security functions of the ASMs for the network as a whole.

* * * * *